(12) United States Patent
Mikami et al.

(10) Patent No.: US 6,528,719 B2
(45) Date of Patent: *Mar. 4, 2003

(54) SPACE PHOTOVOLTAIC POWER GENERATION METHOD AND SYSTEM

(75) Inventors: Izumi Mikami, Tokyo (JP); Yoshihiko Konishi, Tokyo (JP); Kazuyuki Takada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/871,984

(22) Filed: Jun. 4, 2001

(65) Prior Publication Data

US 2002/0029797 A1 Mar. 14, 2002

(30) Foreign Application Priority Data

Sep. 14, 2000 (JP) ......................................... 2000-279786

(51) Int. Cl.⁷ ........................... H01L 31/042; B64G 1/44
(52) U.S. Cl. ........................ 136/292; 136/244; 244/173
(58) Field of Search ................................. 136/292, 244, 136/246; 244/158, 159, 173; 322/2 R

(56) References Cited

U.S. PATENT DOCUMENTS 3,781,647 A * 12/1973 Glaser ........................ 322/2 R
5,223,781 A * 6/1993 Criswell et al. ............ 322/2 R

OTHER PUBLICATIONS

East, T.W.R. "Noise Considerations in the Transmitting Array for the Solar Power Satellite" IEEE Canadian Conference on Electrical and Computer Engineering 1998. Pp. 818–821, vol. 2.*

U.S. patent application Ser. No. 09/838,271, filing date Apr. 20, 2001, pending.
U.S. patent application Ser. No. 09/871898, filing date Jun. 04, 2001, pending.
U.S. patent application Ser. No. 09/871,895, filing date Jun. 4, 2001, pending.
U.S. patent application Ser. No. 09/871,984, filing date Jun. 4, 2001, pending.

* cited by examiner

Primary Examiner—Nam Nguyen
Assistant Examiner—Brian L Mutschler
(74) Attorney, Agent, or Firm—Oblon, Spivak, McClelland, Maier & Neustadt, P.C.

(57) ABSTRACT

A space photovoltaic power generation system including a plurality of power satellites arranged in space, each of which converts electrical energy, into which sunlight has been photoelectric-converted, into a microwave, and transmits the microwave to an electric power base. The space photovoltaic power generation system divides the plurality of power satellites into a number of power satellite groups and adjusts the amount of phase adjustment to be made to a microwave which each of the plurality of power satellites included in each power satellite group will transmit so that a plurality of microwaves from the plurality of power satellites included in each power satellite group are in phase with one another. The beamwidth of the plurality of microwaves can be reduced without increasing the area of the aperture of a transmission antenna of each of the plurality of power satellites. If the plurality of microwaves transmitted from the plurality of power satellites included in each power satellite group interfere with microwaves transmitted from any other power satellite group, the beamwidth is reduced. To avoid the reduction in the beamwidth, each of the plurality of power satellites included in each power satellite group modulates the phase-adjusted microwave so as to generate an incoherent microwave so that the microwave does not interfere with other microwaves transmitted from any other power satellite group.

9 Claims, 3 Drawing Sheets

SPACE PHOTOVOLTAIC POWER GENERATION METHOD AND SYSTEM

BACKGROUND OF THE INVENTION

1. Field of the Invention

The present invention relates to a space photovoltaic power generation method and system for receiving sunlight in space so as to generate electric power, for transmitting the electric power to an electric power base via space by converting the electric power to a microwave, and for storing the electric power in the electric power base so as to allow the use of the electric power.

2. Description of the Prior Art

A solar cell is known as a small-size power generation system which utilizes sunlight. Furthermore, a photovoltaic power generation panel or the like, which can be set up on a building, is known as a power generation system intended for the home which utilizes sunlight. Such a photovoltaic power generation system built on the earth is not necessarily efficient fundamentally because of the attenuation of sunlight in the earth's atmosphere and the alternation between shade and light caused by the alternation between day and night. A solar panel, which can be installed in a satellite, is known as a photovoltaic power generation device intended for space. Satellites can thus achieve missions by privately generating necessary electric power for observation and communications, etc. by using a solar panel. In either of the prior art power generation systems, specific equipment connected to the solar cell by cable is adapted to use the energy generated by the solar cell.

On the other hand, as the communication technology progresses according to results of recent space development works and the construction technology to construct a large-scale space structure progresses, research and development of a system that receives sunlight in space, generates electric power, and transmits the generated energy to a specific place such as a specific location on the earth or in space has been actively conducted. There can be provided an example of such a space photovoltaic power generation system including a plurality of power satellites arranged in space, each of which can focus sunlight to a number of solar panels, photoelectric-convert the incident sunlight so as to generate electric power, and then generate a microwave based on the generated energy and transmit the microwave to an electric power base built on the earth. Since each of the plurality of power satellites may generate a microwave having high energy, an array antenna that can distribute high power equipment, such as high-power amplifiers, among different locations can be effective as a transmission system. The electric power base built on the earth includes a receiving antenna for receiving incident microwaves. The electric power base converts the received microwaves into DC signals and then combine them into DC electric power.

In the above-mentioned prior art space photovoltaic power generation system, to ensure that the microwave transmitted from each of the plurality of geostationary power satellites is incident on the receiving antenna of the electric power base, the beamwidth of the microwave has to be narrowed. In the case of an array antenna, the area of the aperture has to be enlarged to narrow the beamwidth. This results in a disadvantage that the transmission antenna increases in size and hence each of the plurality of power satellites increases in size. On the other hand, to improve the power generation capability of the space photovoltaic power generation system constructed as above, a large number of power satellites each for transmitting a microwave towards the ground by a transmission antenna thereof should be arranged in space. In this case, it is assumed that the group of transmission antennas is a single huge phased array antenna for transmitting microwaves. A problem is that the area of the aperture of the array antenna defined as the group of transmission antennas is too large and the beamwidth of microwaves transmitted via the array antenna is therefore narrowed greatly, and this results in an increase in the per-unit-area electric power received on the earth.

SUMMARY OF THE INVENTION

The present invention is proposed to solve the above-mentioned problem. It is therefore an object of the present invention to provide a space photovoltaic power generation method capable of transmitting microwaves of high electric power generated from sunlight in space to an electric power base while making the beamwidth of the microwaves incident on an electric power base antenna match the size of the electric power base antenna, thereby preventing the per-unit-area electric power received by the electric power base antenna from becoming too large.

In accordance with an aspect of the present invention, there is provided a space photovoltaic power generation method of generating electrical energy from sunlight and converting the generated electrical energy into microwaves by means of a plurality of power satellites arranged in space, transmitting the microwaves to an electric power base, and generating electric power by means of the electric power base, the method comprising the steps of: dividing the plurality of power satellites into a plurality of groups each for including a number of power satellites; adjusting a plurality of microwaves transmitted from the plurality of power satellites included in each of the plurality of power satellite groups so that the plurality of microwaves are in phase with one another; and making a plurality of microwaves to be transmitted from each of the plurality of power satellite groups incoherent so that the plurality of microwaves do not interfere with other microwaves transmitted from any other one of the plurality of power satellite groups, and transmitting the plurality of incoherent microwaves to the electric power base.

In accordance with another aspect of the present invention, there is provided a space photovoltaic power generation system comprising: a plurality of power satellite groups each for including a number of power satellites each for generating electrical energy from sunlight in space, generating a microwave from the generated electrical energy, making the generated microwave incoherent so that the microwave does not interfere with other microwaves transmitted from any other one of the plurality of power satellite groups, and transmitting the incoherent microwave; a control unit for controlling the plurality of power satellites included in each of the plurality of power satellite groups so that a plurality of microwaves transmitted from the plurality of power satellites are in phase with one another; and an electric power base located at a remote site for receiving the plurality of microwaves transmitted from the plurality of power satellites included in each of the plurality of power satellite groups, and for generating electric power from the plurality of microwaves received.

In accordance with a preferred embodiment of the present invention, the control unit includes a location measurement unit for measuring a location of each of the plurality of power satellites included in each of the plurality of power satellite groups, a phase adjustment amount calculation unit for calculating an amount of phase adjustment to be made to the microwave which each of the plurality of power satellites included in each of the plurality of power satellite groups will transmit from the measured location, and a phase control unit for adjusting a phase of the microwave which each of the plurality of power satellites included in each of the plurality of power satellite groups will transmit according to the amount of phase adjustment calculated by the phase adjustment amount calculation unit so that the plurality of microwaves transmitted from the plurality of power satellites included in each of the plurality of power satellite groups are in phase with one another.

The space photovoltaic power generation system can comprise a plurality of control satellites that serve as the control unit, the plurality of control satellites being associated with the plurality of power satellite groups, respectively.

As an alternative, space photovoltaic power generation system can comprise a plurality of control satellites associated with the plurality of power satellite groups, respectively, each of the plurality of control satellites including the location measurement unit, and a transmission unit for informing each of the plurality of power satellites included in each of the plurality of power satellite group of data on the location of each of the plurality of power satellites measured by the location measurement unit. In addition, each of the plurality of power satellites included in each of the plurality of power satellite group can include the phase adjustment amount calculation unit and the phase control unit, and adjusts the phase of the microwave which each of the plurality of power satellites will transmit so that the microwave is in phase with any other microwave transmitted from any other one of the plurality of power satellites according to the calculated amount of phase adjustment.

Further objects and advantages of the present invention will be apparent from the following description of the preferred embodiments of the invention as illustrated in the accompanying drawings.

DETAILED DESCRIPTION OF THE PREFERRED EMBODIMENT

Figure 1:
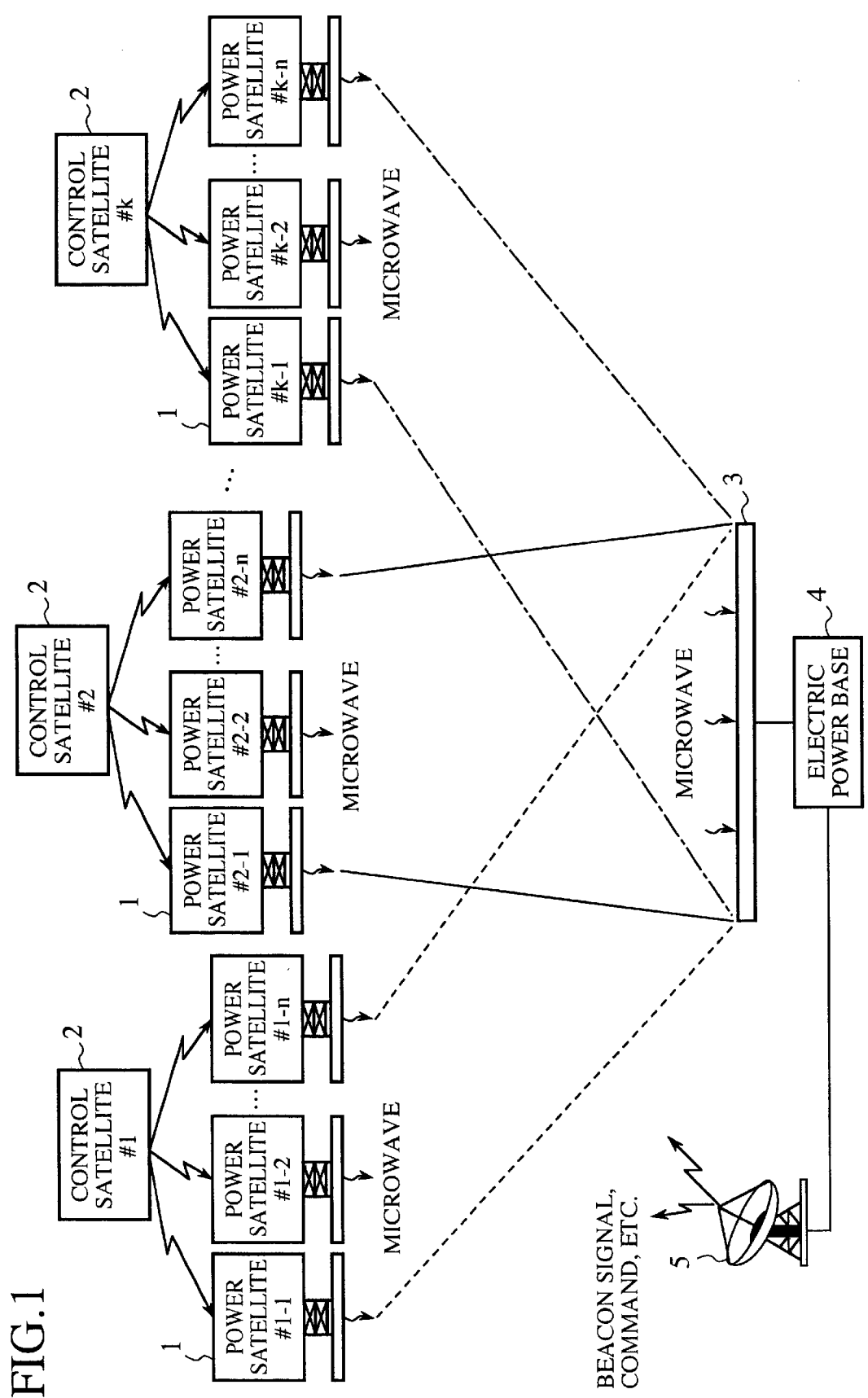
FIG. 1 is a diagram showing the structure of equipment used for a space photovoltaic power generation system according to an embodiment of the present invention.
Figure 2:
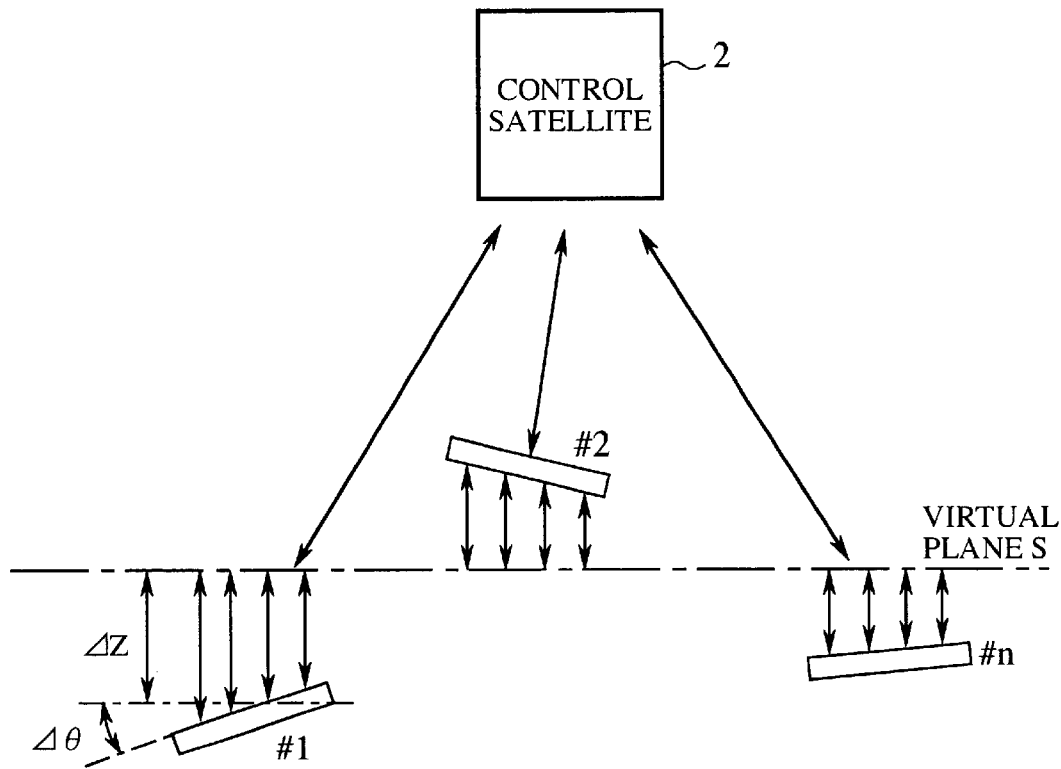
FIG. 2 is a diagram showing the principle underlying a phase adjustment performed by the space photovoltaic power generation system according to the embodiment of the present invention.
Figure 4:
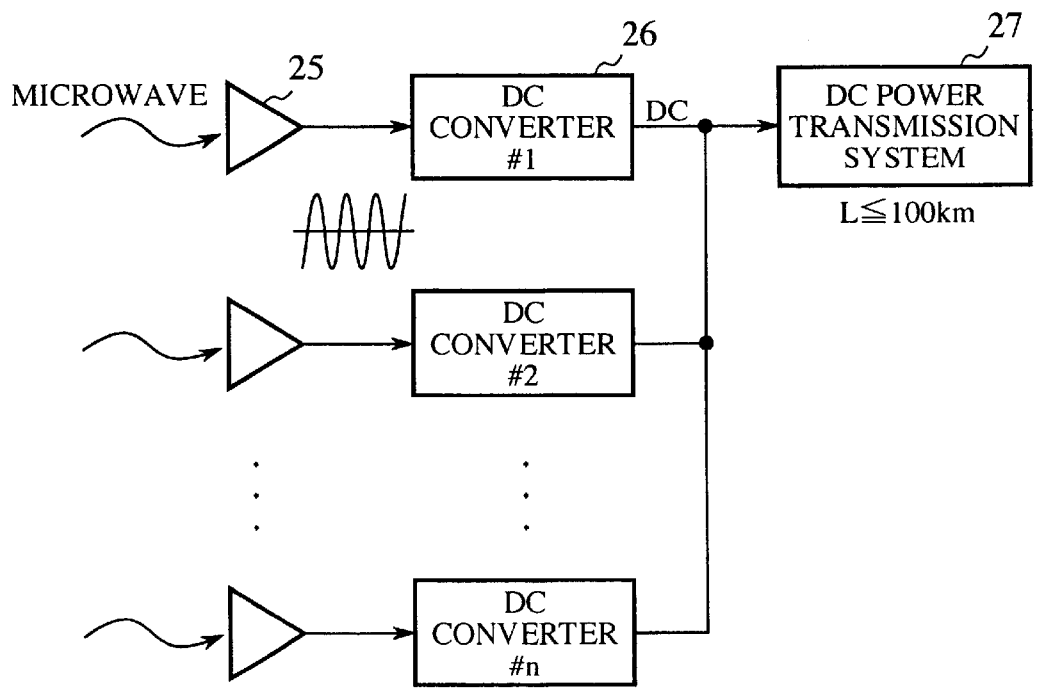
FIG. 4 is a block diagram showing the structure of an electric power base of the space photovoltaic power generation system according to the embodiment of the present invention.
Figure 3:
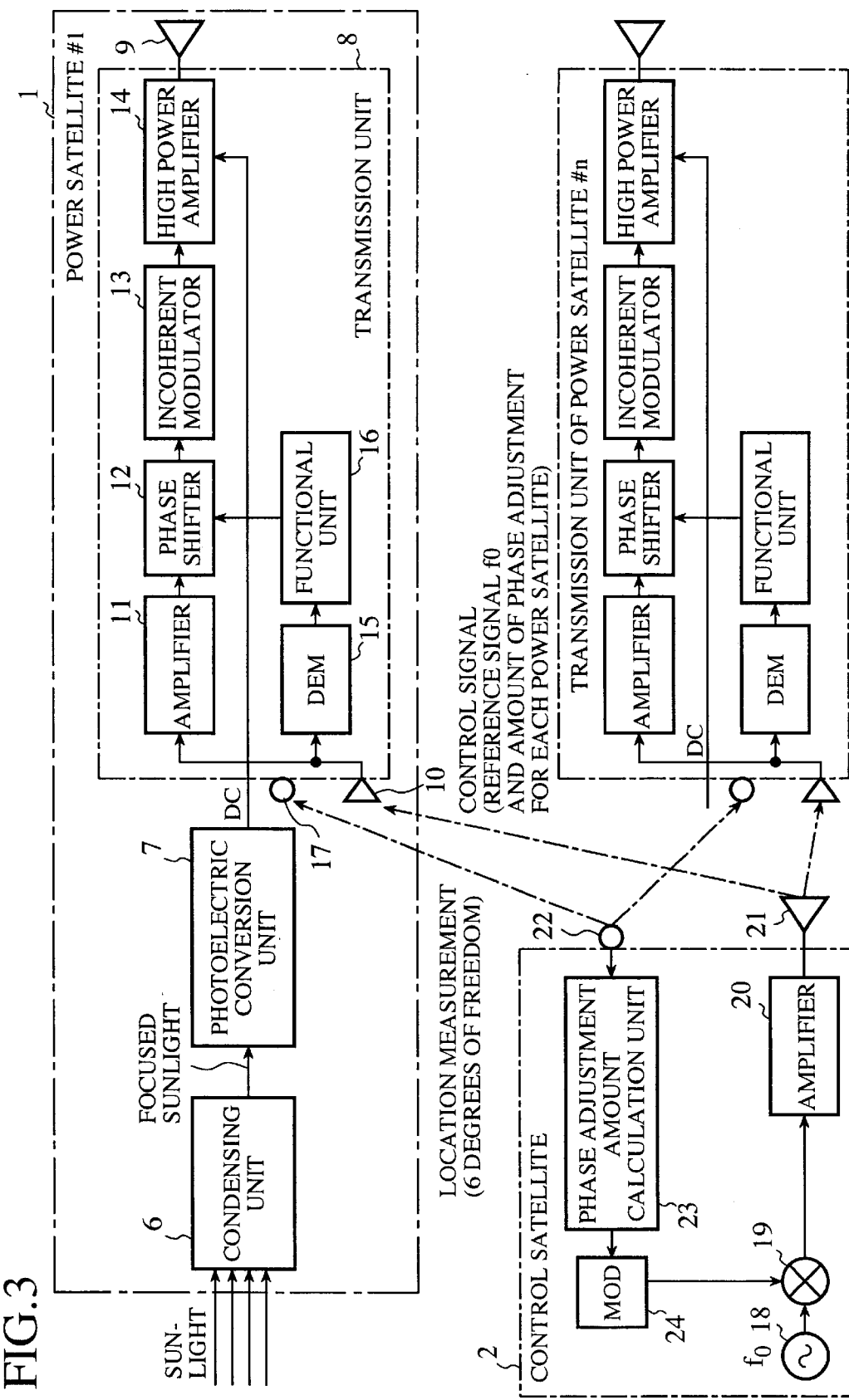
FIG. 3 is a block diagram showing the structure of a power satellite and a control satellite of the space photovoltaic power generation system according to the embodiment of the present invention.

A description will be made as to a space photovoltaic power generation method according to an embodiment of the present invention, and a space photovoltaic power generation system which employs the method, with reference to FIGS. 1 to 4. FIG. 1 is a diagram showing the structure of equipment used for the space photovoltaic power generation method and system according to the embodiment. FIG. 2 is a diagram showing the principle underlying a phase adjustment of the space photovoltaic power generation method according to the embodiment. FIG. 3 is a block diagram showing the structure of a power satellite and the structure of a control satellite of the space photovoltaic power generation system according to the embodiment. FIG. 4 is a block diagram showing the structure of an electric power base of the space photovoltaic power generation system according to the embodiment.

In FIG. 1, reference numeral 1 denotes a power satellite for generating electrical energy from sunlight received in space, for generating a microwave from the electrical energy, and for transmitting the microwave, and numeral 2 denotes a control satellite for controlling an amount of phase adjustment to be made to a microwave which each of a plurality of power satellites 1 will transmit. As shown in the figure, the space photovoltaic power generation system is provided with a plurality of control satellites #1 to #k, and a plurality of power satellite groups each including a plurality of power satellites #i-1 to #i-n, where i=1 to k and n is the number of power satellites included in each power satellite group, the plurality of power satellite groups being associated with the plurality of control satellites #1 to #k, respectively. Reference numeral 3 denotes an electric power base antenna for receiving a plurality of microwaves transmitted from the plurality of power satellites 1 included in each power satellite group, numeral 4 denotes an electric power base for generating electric power from microwaves received by the receiving antenna 3, and numeral 5 denotes a satellite communications antenna disposed for allowing communication between the electric power base 4 and the plurality of control satellites 2.

Each of the plurality of power satellites 1 further converts electrical energy, into which sunlight has been photoelectric-converted, into a microwave, and transmits the microwave to the electric power base 4. The electric power of the microwave that each of the plurality of power satellites 1 can transmit is determined by the capability to focus sunlight, the photoelectric-conversion capability, and the microwave amplification capability of each of the plurality of power satellites 1. The arrangement of the plurality of power satellites 1 in space makes it possible to transmit a microwave of high electric power to the electric power base 4. However, each of the plurality of power satellites 1 changes its attitude in space, and its relative location therefore changes. Therefore, when the plurality of power satellites 1 transmit microwaves independently, these microwaves may balance each other out or they may be transmitted in a direction different from a desired direction, i.e., a direction towards the electric power base 4. The space photovoltaic power generation system according to the present invention divides the plurality of power satellites 1 into a number of power satellite groups and adjusts the amount of phase adjustment to be made to the microwave which each of a plurality of power satellites #i-1 to #i-n (i=1 to k) included in each power satellite group will transmit so that a plurality of microwaves from the plurality of power satellites 1 included in each power satellite group are in phase with one another, in order to enable the electric power base 4 at a remote site to receive the plurality of microwaves from the plurality of power satellites 1 included in each power satellite group. Since the beamwidth of the plurality of phase-adjusted microwaves transmitted from the plurality of power satellites 1 included in each power satellite group is determined by the area of the aperture of an array antenna constructed of the plurality of transmission antennas of the plurality of power satellites 1 included in each power satellite group, the beamwidth can be reduced without increasing the area of the aperture of the transmission antenna of each of the plurality of power satellites.

However, when all of the plurality of power satellites included in the system transmit a plurality of coherent microwaves that can interfere with one another, respectively, the plurality of coherent microwaves have a very narrow beamwidth determined by the area of the aperture area of a huge antenna into which all the transmission antennas of the plurality of power satellites included in the system can be assumed to be integrated. When transmitting a large amount of electric power, the electric power per unit area (referred to as "power density" from here on) which the electric power base receives becomes too large. As previously mentioned, in accordance with the present invention, the space photovoltaic power generation system divides the plurality of power satellites 1 into a number of power satellite groups and adjusts the amount of phase adjustment to be made to the microwave which each of a plurality of power satellites #i-1 to #i-n (i=1 to k) included in each power satellite group will transmit so that a plurality of microwaves transmitted from the plurality of power satellites 1 included in each power satellite group are in phase with one another. In other words, the space photovoltaic power generation system can form a phased array antenna for each of the plurality of power satellite groups by using the plurality of transmission antennas of the plurality of power satellites #i-1 to #i-n (i=1 to k) included in each power satellite group, the area of the aperture of the phased array antenna determining the beamwidth of the plurality of microwaves transmitted from the plurality of power satellites 1 included in each power satellite group. If the plurality of microwaves transmitted from the plurality of power satellites 1 included in each power satellite group interfere with a plurality of microwaves transmitted from a plurality of power satellites 1 included in any other power satellite group, the beamwidth is reduced. To avoid the reduction in the beamwidth, each of the plurality of power satellites 1 included in each power satellite group incoherent-modulates the phase-adjusted microwave so as to generate an incoherent microwave so that the microwave does not interfere with other microwaves transmitted from any other power satellite group, while maintaining the coherence between the microwaves generated by the same power satellite group. For example, each of the plurality of control satellites 2 transmits a timing signal to control the incoherent modulation to each of the plurality of power satellites 1 included in the corresponding power satellite group, and each of the plurality of power satellites 1 modulates the phase-adjusted microwave in synchronization with the timing signal.

The space photovoltaic power generation system according to the present invention then receives a plurality of microwaves transmitted from the plurality of power satellite groups by way of the electric power base antenna 3, and converts the plurality of microwaves received by the electric power base 4 into a low-frequency wave which can be used as electric power. The electric power base 4 can be placed on the earth. As an alternative, the electric power base 4 can be placed in such a location in space as a location of the surface of the moon, a space plant facility, or the like. When the electric power base 4 is located on the earth, it is necessary to reduce the energy density (energy per unit area) of the plurality of microwaves transmitted from the plurality of power satellites from the viewpoint of the flora and fauna environment and electric wave trouble. Therefore, the electric power base antenna 3 can have an area ranging from several tens of square kilometers to several hundreds of square kilometers. In general, such a huge antenna can be formed by arranging a number of antennas each having a specific size in the form of an array, for example. In this case, the electric power base 4 has a function of combining either the plurality of microwaves received via the plurality of antennas or a number of microwaves from a number of antenna groups in addition to a function of converting the composite microwave into a low-frequency wave.

In addition, the electric power base 4 includes the satellite communications antenna 5 as shown in FIG. 1. The electric power base 4 transmits a beacon signal to each of the plurality of control satellites 2 by way of the satellite communications antenna 5. Each of the plurality of control satellites 2 can recognize the direction of the electric power base 4 by catching the beacon signal. Each of the plurality of control satellites 2 controls the amount of phase adjustment to be made to the microwave which each of the plurality of power satellites 1 included in the corresponding power satellite group will transmit so that the microwave from each of the plurality of power satellites 1 can be transmitted in the direction.

Next, a description will be made as to the principle underlying the phase adjustment performed on the microwave which each of the plurality of power satellites 1 included in each power satellite group will transmit with reference to FIG. 2. In FIG. 2, plates designated by #1, #2, and #n depict the front surfaces of antennas included in the plurality of power satellites #i-1, #i-2, and #i-n, respectively. Each of the plurality of control satellites 2 catches the beacon signal from the electric power base 4, and recognizes the direction of the electric power base 4, as mentioned above. Each of the plurality of control satellites 2 defines a virtual plane S orthogonal to the direction, and determines a relationship between the virtual plane S and each of the plurality of antenna front surfaces #1, #2, and #n so as to calculate the amount of phase adjustment for each of the plurality of power satellites #1, #2, and #n. Each of the plurality of antenna front surfaces #1, #2, and #n has 6 degrees of freedom including three degrees of freedom in translation directions and three degrees of freedom in rotational directions, which change along with a change in the attitude of the corresponding power satellite. Each of the plurality of control satellites 2 can fundamentally specify the location of each of the plurality of power satellites 1 or each of the plurality of antenna front surfaces by measuring distances between each of the plurality of control satellites and three points located on each of the plurality of power satellites 1 or each of the plurality of antenna front surfaces. Each of the plurality of control satellites 2 then determines a difference between each of the plurality of antenna front surfaces and the virtual plane S from the virtual plane S and the location of each of the plurality of antenna front surfaces. The difference can be divided into a translation component $\Delta z$ and a rotational component $\Delta\Theta$, as shown in FIG. 2. $\Delta z$ component can be assumed to be one used for phase adjustment between the power satellite and the other power satellites and $\Delta\Theta$ component can be assumed to be one used for phase adjustment with respect to a direction orthogonal to the virtual plane S. The phase adjustment with ($\Delta z$ component+$\Delta\Theta$ component) is needed for the adjustment of the orientation of each of the plurality of antenna front surfaces. In this adjustment, an amount of adjustment of $2\pi n$ (n is an integer) can be subtracted from the amount of phase adjustment for each of the plurality of antenna front surfaces.

Thus, each of the plurality of control satellites 2 can calculate the amount of phase adjustment to be made to the microwave which each of the plurality of power satellites 1 included in the corresponding power satellite group will transmit. A part of the functionality can be included in each of the plurality of power satellites. In this case, each of the plurality of control satellites 2 catches the beacon signal from the electric power base 4, and recognizes the direction of the electric power base 4 so as to define the virtual plane S. Each of the plurality of control satellites 2 also measures the location of each of the plurality of power satellites 1, and notifies each of the plurality of power satellites 1 of the virtual plane S and the location of each of the plurality of power satellites 1. Each of the plurality of power satellites 1 calculates the amount of phase adjustment, as mentioned above, based on the notified virtual plane S and the notified location of each of the plurality of power satellites 1.

Next, the structure of each of the plurality of power satellites 1 included in each power satellite group and the structure of each of the plurality of control satellites 2 will be explained with reference to FIG. 3. Each of the plurality of power satellites 1 is provided with a condensing unit 6 for focusing sunlight rays in space to an area, the condensing unit 6 being constructed of a catoptric system, a dioptric system, or the like. Each of the plurality of power satellites 1 further includes a photoelectric conversion unit 7 for receiving the sunlight focused by the condensing unit 6 and for converting the focused sunlight into electrical energy, a transmission unit 8 for converting the electrical energy generated by the photoelectric conversion unit 7 into a microwave, and a transmission antenna 9 for sending out the microwave to space. The transmission unit 8 is provided with a receiving antenna 10 for receiving a control signal from the corresponding control satellite 2, an amplifier 11 for amplifying a reference signal f0 included in the control signal, a phase shifter 12 for phase-shifting the microwave according to the amount of phase adjustment included in the control signal, an incoherent modulator 13 for incoherent-modulating the microwave output from the phase shifter 12 by using a modulation technique, such as a spread-spectrum modulation, so as to output an incoherent microwave, and a higher power amplifier 14 for amplifying the incoherent microwave from the incoherent modulator 13 with high power so as to output a microwave having power corresponding to the electric energy generated by the photoelectric conversion unit 7. The transmission unit 8 further includes a demodulation unit (DEM) 15 for demodulating the control signal from the control satellite 2, and a functional unit 16 for generating and providing an instruction to the phase shifter 12 based on the amount of phase adjustment included in the control signal. Each of the plurality of power satellites 1 further includes a corner reflector 17 disposed to enable the corresponding control satellite 2 to measure the location of each of the plurality of power satellites 1. The corner reflector 17 only has to reflect either light or electromagnetic waves including light. Each of the plurality of control satellites 2 is provided with an oscillator 18 for generating the reference signal f0, a mixer 19 for mixing a signal modulated according to the amount of phase adjustment calculated for each of the plurality of power satellites into the reference signal f0 so as to generate the control signal, an amplifier 20 for amplifying the control signal to transmit the control signal to each of the plurality of power satellites 1 included in the corresponding power satellite group, and a transmission antenna 21. Each of the plurality of control satellites 2 is further provided with a location measurement unit 22 for measuring the location of each of the plurality of power satellites 1 included in the corresponding power satellite group. A laser measurement unit can be used as the location measurement unit 22, and a measurement unit using an electromagnetic wave can be alternatively used. Each of the plurality of control satellites 2 further includes a phase adjustment amount calculation unit 23 for calculating the amount of phase adjustment for each of the plurality of power satellites 1 included in the corresponding power satellite group based on the above-mentioned principle underlying the calculation of the phase adjustment amount, and a modulator 24 for modulating a signal according to the amount of phase adjustment calculated by the phase adjustment amount calculation unit 23.

Next, conversion of sunlight into a microwave and transmission of the microwave in each of the plurality of power satellites 1 included in each power satellite group will be explained. Each of the plurality of power satellites 1 focuses sunlight to the photoelectric conversion unit 7 by means of the condensing unit 6. This is because the energy density of the sunlight which the photoelectric conversion unit 7 constructed of a number of solar cells receives can be increased by focusing the sunlight to the photoelectric conversion unit 7. The condensing unit 6 can consist of a reflector or the like having a diameter of up to several tens of meters. As an alternative, the photoelectric conversion unit 7 can be so constructed as to receive sunlight directly, instead of the provision of the condensing unit 6. The photoelectric conversion unit 7 can consist of a plurality of solar panels arranged, and receive sunlight focused by the condensing unit 6 or directly receive sunlight and then photoelectric-convert the received sunlight into electrical energy. The electrical energy generated by the photoelectric conversion unit 7 is then input to the high power amplifier 14 within the transmission unit 8. Since the output of a solar cell is a DC component in general, the output is therefore changed in voltage and stabilized properly and is then input to the high power amplifier. The transmission unit 8 generates a microwave from the reference signal f0 included in the control signal which the transmission unit 8 has received from the corresponding control satellite 2 by way of the receiving antenna 10. The purpose of receiving the reference signal f0 from the corresponding control satellite 2 is to make the respective reference signals f0 in the plurality of power satellites 1 in phase with one another. The reference signal f0 is then amplified by the amplifier 11 and is phase-shifted by the phase shifter 12. The incoherent modulator 13 incoherent-modulates the microwave output from the phase shifter 12 by using a modulation technique, such as a spread-spectrum modulation, so as to output an incoherent microwave. The spread-spectrum modulation is a modulation technique that reduces the strength of the output microwave and spreads a band of transmitted frequencies over a broad band, thereby preventing the interference between the output microwave and other microwaves. Fundamentally, the total energy of the output microwave is the same as that not-yet-spread-spectrum-modulated. The high power amplifier 14 amplifies the incoherent microwave from the incoherent modulator 13 with high power so as to output a microwave having power corresponding to the electrical energy generated by the photoelectric conversion unit 7. This microwave is sent out to space by way of the transmission antenna 9. The phase shifter 12 is instructed by the functional unit 16 to phase-shift the microwave from the amplifier 11 based on the amount of phase adjustment included in the control signal from the control satellite 2. The control signal from the control satellite 2 includes a signal which has been modulated according to the amount of phase adjustment calculated for each of the plurality of power satellites 1. The demodulation unit 15 demodulates the control signal. The functional unit 16 generates bit information to be set to the phase shifter 12 based on the demodulated amount of phase adjustment.

Next, the control of each of the plurality of power satellites included in each power satellite group by the corresponding control satellite 2 will be explained. The control satellite 2 sends light or the like aiming at the corner reflector 17 located on each of the plurality of power satellites 1 to measure the location of each of the plurality of power satellites 1 by means of the location measurement unit 22. The phase adjustment amount calculation unit 23 then calculates the amount of phase adjustment for each of the plurality of power satellites 1 from data on the measured location of each of the plurality of power satellites according to the above-mentioned principle underlying the phase adjustment amount calculation. The modulator 24 modulates a signal according to the amount of phase adjustment calculated for each of the plurality of power satellites 1. The oscillator 18 generates a reference signal fo be used by each of the plurality of power satellites, and the mixer 19 mixes the signal modulated according to the amount of phase adjustment into the reference signal f0 so as to generate a control signal. The amplifier 20 amplifies the control signal to transmit it to each of the plurality of power satellites 1, and then transmits the amplified control signal to each of the plurality of power satellites 1 included in the corresponding power satellite group by way of the transmission antenna 21. The control satellite 2 further includes a communications antenna (not shown in FIG. 3) for catching the beacon signal from the electric power base 4 in order to define the virtual plane S for the calculation of the phase adjustment amount.

By adding one or more power satellites 1 constructed as above and applying the control signal from a corresponding control satellite 2 constructed as above to the added one or more power satellites, all of the generated microwaves including the microwaves from the added one or more power satellites can be made to be in phase with one another. Therefore, the electric power generation capability can be improved regardless of a limit on the photoelectric conversion capability of each of the plurality of power satellites 1, a limit on the high power amplification capability of each of the plurality of power satellites 1, and a limit on the power transmission capability.

Next, the structure of the electric power base 4 will be explained with reference to FIG. 4. The electric power base 4 includes a plurality of receiving antennas 25 that constitute the electric power base antenna 3 for receiving microwaves from the plurality of power satellites 1, a plurality of DC converters 26 each for converting one received microwave to DC electric power, and a DC electric power transmission system 27 for transmitting the DC electric power. The electric power base 4 transmits a beacon signal to enable each of the plurality of control satellites 2 to determine the direction of the electric power base 4 to each of the plurality of control satellites by way of the satellite communication antenna 5, which are not shown in FIG. 4.

Each of the plurality of DC converters 26 converts a microwave from one power satellite 1, which has been received by the corresponding receiving antenna 25 of the electric power base 4, into a low-frequency wave. A plurality of low-frequency waves thus generated by the plurality of DC converters 26 are then combined and the composite low-frequency wave is transmitted by the DC electric power transmission system 27. Since the area occupied by the plurality of receiving antennas is large as mentioned above, the electric power base 4 can be constructed on a frontier such as the coastal area of a solitary island, or a desert.

Therefore, the DC electric power transmission system 27 should transmit the generated electric power to towns and cities with a high degree of transmission efficiency.

In accordance with the embodiment of the present invention, the space photovoltaic power generation system can thus transmit incoherent microwaves generated by a plurality of power satellite groups to an electric power base while adjusting the phases of a plurality of microwaves transmitted from a plurality of power satellites included in the same group so that the plurality of microwaves are in phase with one another. Accordingly, the incoherent microwaves can have a beamwidth corresponding to the size of a receiving antenna of the electric power base. Even when transmitting high electric power by providing a large number of power satellites, microwaves transmitted to the electric power base have a bandwidth that is not too narrow and the electric power density of microwaves received by the electric power base can be reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A space photovoltaic power generation method of generating electrical energy from sunlight and converting the generated electrical energy into microwaves by a plurality of power satellites arranged in space, transmitting the microwaves to an electric power base, and generating electric power by said electric power base, said method comprising the steps of:

dividing said plurality of power satellites into a plurality of power satellite groups each including a number of power satellites;

determining, via at least one control satellite, an amount of phase adjustment for a plurality of microwaves transmitted from the plurality of power satellites included in each of said plurality of power satellite groups so that the plurality of microwaves are in phase with one another;

adjusting the plurality of microwaves transmitted from the plurality of power satellites included in each of said plurality of power satellite groups based on the amount of phase adjustment determined in the determining step so that the plurality of microwaves are in phase with one another; and making a plurality of microwaves to be transmitted from each of said plurality of power satellite groups incoherent so that the plurality of microwaves do not interfere with other microwaves transmitted from any other one of said plurality of power satellite groups, and transmitting the plurality of incoherent microwaves to said electric power base.

2. A space photovoltaic power generation system comprising:

a plurality of power satellite groups each including a plurality of power satellites each for generating electrical energy from sunlight in space, for generating a microwave from the generated electrical energy, for making the generated microwave incoherent so that the microwave does not interfere with other microwaves transmitted from any other one of said plurality of power satellite groups, and for transmitting the incoherent microwave;

a control means within at least one control satellite for controlling said plurality of power satellites included in each of said plurality of power satellite groups so that a plurality of microwaves transmitted from said plurality of power satellites are in phase with one another; and an electric power base located at a remote site for receiving the plurality of microwaves transmitted from said plurality of power satellites included in each of said plurality of power satellite groups, and for generating electric power from the plurality of microwaves received.

3. The space photovoltaic power generation system according to claim 2, wherein said control means includes a location measurement means for measuring a location of each of said plurality of power satellites included in each of said plurality of power satellite groups, a phase adjustment amount calculation means for calculating an amount of phase adjustment to be made to the microwave which each of said plurality of power satellites included in each of said plurality of power satellite groups will transmit from the measured location, and a phase control means for adjusting a phase of the microwave which each of said plurality of power satellites included in each of said plurality of power satellite groups will transmit according to the amount of phase adjustment calculated by said phase adjustment amount calculation means so that the plurality of microwaves transmitted from said plurality of power satellites included in each of said plurality of power satellite groups are in phase with one another.

4. The space photovoltaic power generation system according to claim 3, wherein the at least one control satellite includes a plurality of control satellites that serve as said control means, said plurality of control satellites being associated with said plurality of power satellite groups, respectively.

5. The space photovoltaic power generation system according to claim 3, wherein the at least one control satellite includes a plurality of control satellites associated with said plurality of power satellite groups, respectively, each of said plurality of control satellites including said location measurement means, and a transmission means for informing each of said plurality of power satellites included in each of said plurality of power satellite groups of data on the location of each of said plurality of power satellites measured by said location measurement means, and wherein each of said plurality of power satellites included in each of said plurality of power satellite groups includes said phase adjustment amount calculation means and said phase control means, and adjusts the phase of the microwave which each of said plurality of power satellites will transmit so that the microwave is in phase with any other microwave transmitted from any other one of said plurality of power satellites according to the calculated amount of phase adjustment.

6. A space photovoltaic power generation system comprising:

a plurality of power satellite groups each including a number of power satellites each configured to generate electrical energy from sunlight in space, to generate a microwave from the generated electrical energy, to make the generated microwave incoherent so that the microwave does not interfere with other microwaves transmitted from any other one of said plurality of power satellite groups, and to transmit the incoherent microwave;

a control unit within at least one control satellite and configured to control said plurality of power satellites included in each of said plurality of power satellite groups so that a plurality of microwaves transmitted from said plurality of power satellites are in phase with one another; and an electrical power base located at a remote site and configured to receive the plurality of microwaves transmitted from said plurality of power satellites included in each of said plurality of power satellite groups, and to generate electric power from the plurality of microwaves received.

7. The space photovoltaic power generation system according to claim 6, wherein said at least one control satellite includes a location measurement unit configured to measure a location of each of said plurality of power satellites included in each of said plurality of power satellite groups, a phase adjustment amount calculation unit configured to calculate an amount of phase adjustment to be made to the microwave which each of said plurality of power satellites included in each of said plurality of power satellite groups will transmit from the measured location, and a phase control unit configured to adjust a phase of the microwave which each of said plurality of power satellites included in each of said plurality of power satellite groups will transmit according to the amount of phase adjustment calculated by said phase adjustment amount calculation unit so that the plurality of microwaves transmitted from said plurality of power satellites included in each of said plurality of power satellite groups are in phase with one another.

8. The space photovoltaic power generation system according to claim 7, wherein the at least one control satellite includes a plurality of control satellites associated with said plurality of power satellite groups, respectively.

9. The space photovoltaic power generation system according to claim 7, wherein the at least one control satellite includes plurality of control satellites associated with said plurality of power satellite groups, respectively, each of said plurality of control satellite including said location measurement unit, and a transmission unit configured to inform each of said plurality of power satellites included in each of said plurality of power satellites groups of data on the location of each of said plurality of power satellites measured by said location measurement unit, and wherein each of said plurality of power satellites included in each of said plurality of power satellites group includes said phase adjustment amount calculation unit and said phase control unit, and adjusts the phase of the microwave which each of said plurality of power satellites will transmit so that the microwave is in phase with any other microwave transmitted from any other one of said plurality of power satellites according to the calculated amount of phase adjustment.

* * * * *